(12) United States Patent
Britt

(10) Patent No.: US 6,327,355 B1
(45) Date of Patent: Dec. 4, 2001

(54) USE OF PLATFORM-INDEPENDENT CODE FOR SUPPORTING SERVICES IN AN INTELLIGENT NETWORK

(75) Inventor: Margaret Britt, Pointe-Claire (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/240,041

(22) Filed: Jan. 29, 1999

(51) Int. Cl.[7] ................................................ H04M 3/42
(52) U.S. Cl. ................ 379/201.03; 379/221.08; 379/207.02; 455/433
(58) Field of Search .................... 379/230, 221.08, 379/219, 207.02, 201.03; 455/433, 466, 560

(56) References Cited

U.S. PATENT DOCUMENTS

| | | |
|---|---|---|
| 4,780,821 | 10/1988 | Crossley . |
| 5,379,383 | 1/1995 | Yunoki . |
| 5,526,415 | 6/1996 | Wakamoto . |
| 5,566,235 | 10/1996 | Hetz . |
| 5,978,484 | 11/1999 | Apperson et al. ............... 380/25 |
| 6,052,456 * | 4/2000 | Huang .................... 379/93.17 X |
| 6,058,175 * | 5/2000 | Schultz ..................... 379/207 |
| 6,160,871 * | 12/2000 | Dukee et al. ................ 379/27 X |
| 6,161,128 * | 12/2000 | Smyk .......................... 709/203 X |
| 6,181,935 * | 1/2001 | Glossman et al. ............. 455/433 |

FOREIGN PATENT DOCUMENTS

WO 98/28885  7/1998  (WO) .
WO 99/03251  1/1999  (WO) .

OTHER PUBLICATIONS

Fig 1: Simple Intellegent Network; source: "The Bluffer's Guide to Intelligent Networks" by David Havelin.
PCT International Search Report for PCT/SE00/00072; Aug. 11, 2000.

* cited by examiner

Primary Examiner—Creighton Smith
(74) Attorney, Agent, or Firm—Jenkens & Gilchrist, P.C.

(57) ABSTRACT

A system and method for implementing services in an intelligent network of a telecommunications system. Upon registration of a subscriber station in a mobile telecommunications network, a plurality of triggers associated with the subscriber are downloaded to a switch that is handling the call. Subsequently, a trigger condition is detected at the switch, and a query signal is sent to a server storing data for responding to the trigger condition. In response to the query signal, a bundle of platform independent code comprising instructions for executing a particular service is downloaded to the switch. The code is executed at the switch to implement the particular service, and appropriate actions are taken in accordance with the implemented service.

30 Claims, 3 Drawing Sheets

USE OF PLATFORM-INDEPENDENT CODE FOR SUPPORTING SERVICES IN AN INTELLIGENT NETWORK

BACKGROUND OF THE INVENTION

1. Technical Field of the Invention

The present invention relates to a method and system for implementing services in a telecommunications network, and in particular for transferring, upon detection of a trigger condition, portable code from one telecommunications node to another in an intelligent network and executing the code at the latter node.

2. Description of Related Art

As stored program-controlled (SPC) switching systems have evolved, a wide variety of useful features have been developed to extend the communication capabilities such systems provide. Such services or features include call forwarding, "800" or toll free services, call screening, and the like. With the development and improvement of sophisticated telecommunications applications, the telecommunications industry has adopted the term "intelligent network" (IN) to denote a concept and architecture for providing standardized interfaces between the service logic and the switching system of a multi-vendor telecommunications network. The goals of the IN are to centralize the service execution in a control node within a telecommunications network to provide rapid definition, testing and introduction of new services as well as to simplify the modification of existing services. IN also provides greater flexibility in the design and development of new services in a multi-vendor environment with shorter lead time and standard network interfaces.

The basic concept behind IN is to move the "intelligence" out of each local exchange or Service Switching Point (SSP) and centralize the services providing the intelligence in a Service Control Point (SCP). At specific points during the processing and execution of a call in an IN telecommunications system, the SSP determines whether certain trigger conditions are met. These trigger conditions, for instance, might include the initiation of a call, the receipt of an abbreviated dialing code, or the receipt of an indication that a called station is currently busy. If no trigger conditions are met, then the SSP proceeds according to normal call processing. Otherwise, if certain trigger conditions are met, the SSP sends a query over a network, such as a Signaling System No. 7 (SS7) network, to the SCP requesting instructions on how to proceed with processing of the call. The SCP responds to the request by executing one or more service features contained in a service library associated with the SCP. Then, an instruction or set of instructions are sent from the SCP to the SSP informing the SSP on how to proceed. The ongoing call is further processed by the SSP according to these instructions.

Despite efforts to permit more rapid introduction of new services and greater service flexibility through use of IN, significant barriers still exist to the introduction of new or more customized services into the IN. First, although it is easier to add new intelligence to the SCP (as permitted in IN systems) rather than to the switch itself (as in pre-IN systems), IN still requires that new or revised protocols be developed and introduced to enable widespread introduction of new services in a multi-vendor environment. The development and implementation of new protocols, however, can take years in some cases and can cause significant delays in the introduction of new services.

Alternatively, new services can be implemented on a proprietary (i.e., single vendor) basis. The use of proprietary services, however, generally precludes widespread availability of the services. Network operators typically use components from multiple vendors. An incompatibility of components from different vendors can sometimes prevent operators from being able to implement proprietary services. Furthermore, even where a particular operator is able to offer proprietary services, wireless subscribers will often not be able to access those services when they are roaming in visited networks, again, because of incompatibility problems.

There is a need, therefore, for a system and method that would permit new services to be introduced into a multi-vendor environment without requiring a corresponding introduction of new standards. In addition, there is a need for a system and method that would permit the development and introduction of more flexible and/or subscriber-customized service features. Preferably, such a system and method could be utilized across different networks without having to develop standardized interfaces.

SUMMARY OF THE INVENTION

The present invention comprises a system and method for implementing specialized service features in a telecommunications network. Upon detection of a trigger condition, which can be associated with a particular subscriber, switch (office), or group, a request for instructions on how to respond to the trigger condition is sent from a switch (or other node in the network) that is in some way associated with the subscriber or group. This request can be sent to a Service Control Point (SCP) or some other type of server that stores information for responding to the trigger condition. In response to the request, a bundle of platform independent code is transmitted from a sending telecommunications node to a receiving telecommunications node. The platform independent code comprises a portable, executable set of instructions for implementing a particular service feature that is responsive to the trigger condition. The receiving node executes the platform independent code to implement the service feature, and appropriate actions are taken by the network in accordance with the outcome of the implemented service.

An important technical advantage of the invention is that new telecommunications services can be introduced with minimal lead time. In addition, the new services can be introduced without requiring new standards or protocols to be developed and introduced. The services can also be transferred to and supported by a visited system when a subscriber station is roaming. Another advantage of the invention is that increased flexibility and customization of services is permitted.

BRIEF DESCRIPTION OF THE DRAWINGS

For a more complete understanding of the present invention, reference is made to the following detailed description taken in conjunction with the accompanying drawings wherein.

DETAILED DESCRIPTION OF THE INVENTION

Figure 1:
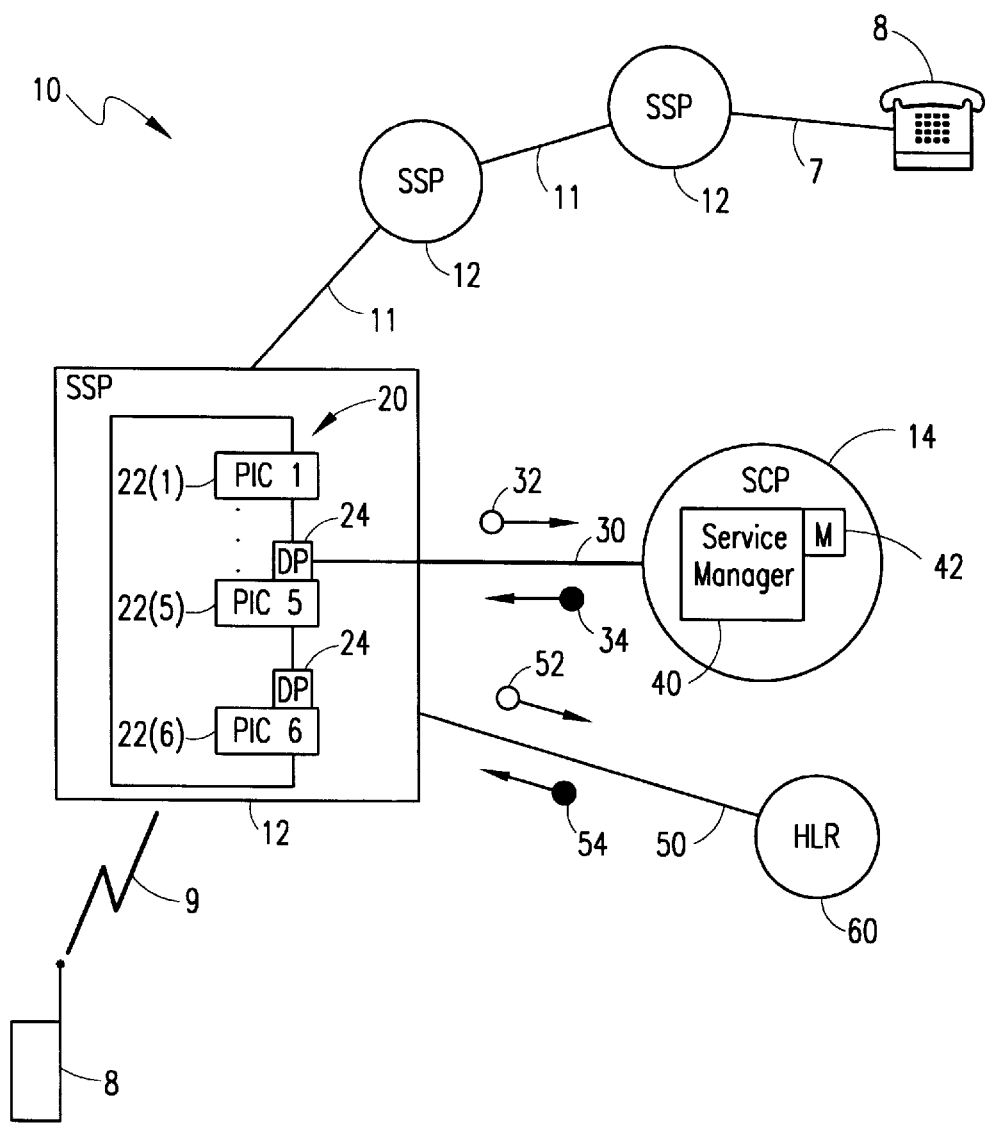
FIG. 1 is a block diagram of a portion of a prior art Intelligent Network (IN) telecommunications system for responding to trigger conditions that occur in the IN system during a call between two subscriber stations.

Referring to FIG. 1, there is depicted a portion of a prior art Intelligent Network (IN) telecommunications system 10 illustrating the operation of the IN system 10 during a call between two subscriber stations 8. The system 10 includes a Call Control Function/Service Switching Function (CCF/SSF), which is typically implemented in a Service Switching Point (SSP) 12. The system 10 also includes a Service Control Function (SCF), which is typically implemented in a Service Control Point (SCP) 14. The SSP 12 and the SCP 14 are primarily responsible for the processing of a call involving a particular subscriber station 8 and for executing IN services, respectively. Typically, the SSP 12 that is involved in the call processing comprises an originating telecommunications switch when the subscriber station 8 is the calling party or a terminating telecommunications switch when the subscriber station 8 is the called party. During a call, communications are transmitted between the subscriber station 8 and the SSP 12 via an air interface 9 in a mobile telecommunications system or via a wireline connection 7 in a wireline telecommunications system. In addition, trunk connections 11 are established through a series of SSPs 12 to connect the originating SSP 12 with the terminating SSP 12 and to permit communications between the two subscriber stations 8. In a mobile telecommunications network, the SSP 12 is preferably included in a platform that comprises a mobile switching center (MSC), while the SCP 14 is part of a separate platform that is coupled to the SSP 12 by a Switching System No. 7 (SS7) link 30.

Calls occurring in an IN system are typically represented by a call model (as generally shown at 20). The call model 20 includes a number of possible states that can exist during the set-up, connection, processing, and termination of a call. Each state constitutes a "point in call" (PIC) 22. These PICs are not embodied in any physical or tangible form but, instead, merely represent different states or conditions that can exist during the call process. A call in a typical telecommunications system, for example, might begin at a first PIC 22(1) that defines an idle state, with a subsequent transition to a second PIC (not shown) in accordance with a call origination message. At a third PIC (not shown), the dialed digits are collected and then analyzed at a fourth PIC (not shown). The call is through-connected at a fifth PIC 22(5) and, finally, is eventually released at a sixth PIC 22(6), at which point the system returns to the idle state of the first PIC 22(1). Although six PICs are discussed here for illustrative purposes, the typical IN call model includes numerous PICs, the number and function of which are defined in the art. Normally, the PICs 22 associated with an originating side of a call are different from the PICs 22 associated with a terminating side of the call.

In between the PICs 22 in the call model are detection points 24, at which the SSP 12 determines if certain trigger conditions are met. Generally, triggers are related to the occurrence of some event with respect to a particular subscriber station 8. For example, a trigger might be activated upon receipt of a call origination request from a subscriber station 8, receipt of a request to set up a call connection directed to the subscriber station 8, or receipt in the switch of a specific digit sequence that might indicate a request for a particular service. The SSP 12 contains a list of triggers that are stored at the SSP 12 in a wireline network or that are retrieved during registration (or upon receipt of a LOCREQ in a gateway context) in a wireless network. For example, in a wireless network, a subscriber information request signal 52 is sent to the mobile station's Home Location Register (HLR) 60 via an SS7 link 50 when the mobile station registers in a certain area, and in response, a subscriber information response signal 54 is received from the HLR 60. The response signal 54 typically indicates which triggers should be activated for the mobile user to provide him with the services to which he has subscribed. The response signal 54 also indicates the address(es) of the SCP(s) to be contacted for service execution. If a trigger is "hit" during a call involving the subscriber station, the SSP 12 causes a message 32 to be sent over the SS7 link 30 to the SCP 14 querying the SCP 14 for instructions on how to respond to the trigger condition. The query message 32 contains information identifying the subscriber as well as the trigger condition. In response, the SCP coordinates and executes the appropriate services that are responsive to the specified trigger condition. Depending on the type of trigger condition, the query message 32 might cause the execution by the SCP 14 of a single service or multiple services.

Although the PICs 22 in the call model 20 are depicted in the Figures in a loop-type progression, calls do not always follow a strict sequence of PICs 22 in an IN network. Instead, instructions for IN services can cause the SSP 12 to depart from the standard sequence of PICs 22 by skipping one or more PICs 22 or by returning to a preceding PIC 22. Thus, the sequence of the PICs 22 can change according to which triggers are hit during the course of the call and what instructions are returned by the SCP 14 in response to those trigger conditions.

The query message 32 generated at a detection point 24 is received at the SCP 14. The SCP 14 identifies, according to certain data stored in an SCP memory 42, which services are implicated by the particular trigger condition indicated by the query message 32. The SCP 14 also determines which services the particular mobile user has subscribed to by referring to the mobile user's subscriber information stored in that SCP 14. A service manager 40 at the SCP 14 then executes the applicable services, and based on the outcome of the execution of the services, a response signal 34 is sent back to the SSP 12 via the SS7 link 30. The response signal 34 contains an instruction or set of instructions directing the SSP 12 on how to proceed with the ongoing call.

One example of a service that can be executed in accordance with the above description is abbreviated dialing. Abbreviated dialing is a service wherein a four digit code dialed by a mobile user is transformed into a dialable number (e.g., a ten digit directory number) by the network. Upon detection of a four digit code in the SSP 12, a query signal 32 is sent to the SCP 14 identifying the mobile station 8 and providing the four digit code. The SCP 14 determines that the abbreviated dialing service is implicated by the received code and executes a service translating the dialed digits into a routable number. The SCP 14 then performs the necessary processing to implement the service and sends an instruction message 34 directing the SSP 12 to route the call to the appropriate routable number.

Figure 2:
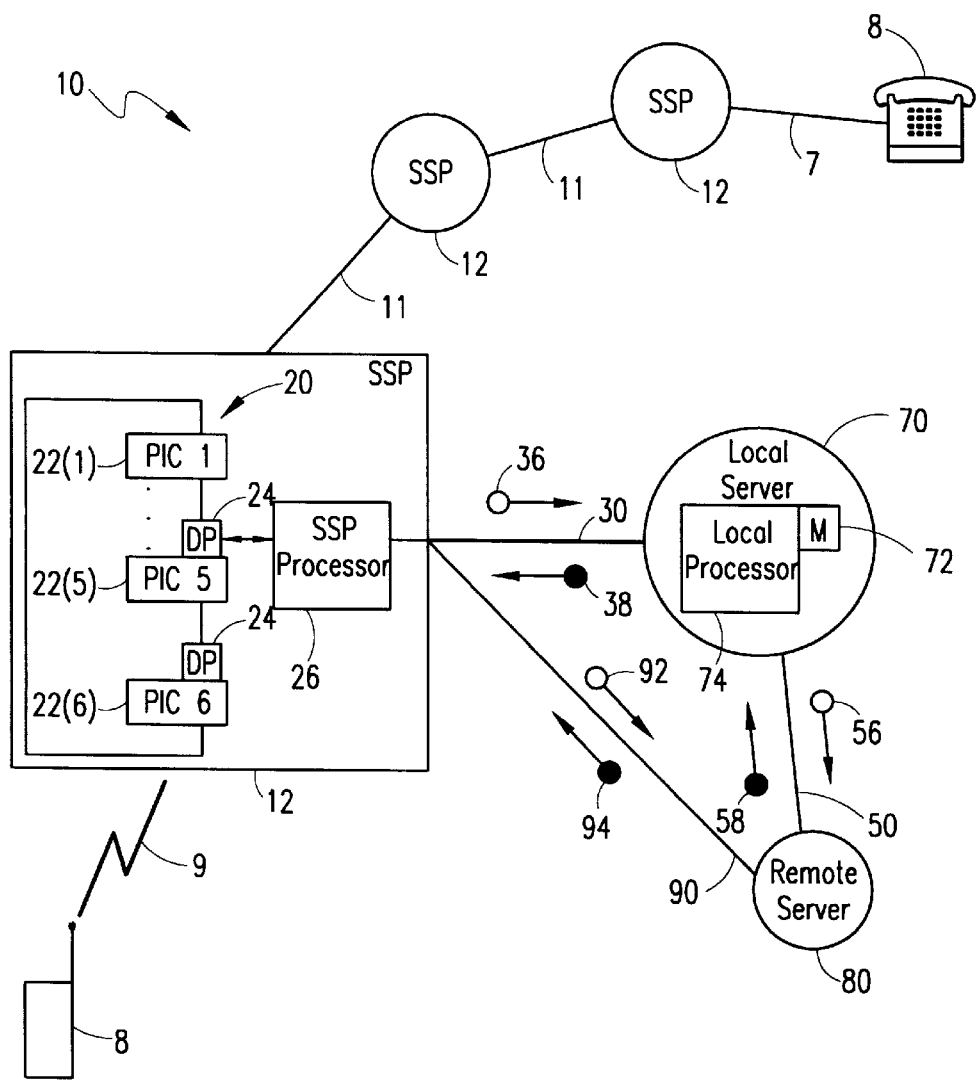
FIG. 2 is a block diagram of a portion of an Intelligent Network (IN) telecommunications system for responding, in accordance with the present invention, to trigger conditions occurring in the IN system through a local execution of a portable, platform-independent code.

Reference is now made to FIG. 2, which depicts a portion of an IN telecommunications system for responding, in accordance with the present invention, to trigger conditions occurring in the IN system through a local execution of a portable, platform-independent code. As in the system of FIG. 1, a trigger condition is detected at a detection point 24. Also as in the system of FIG. 1, the SSP 12 is generally unaware of which services are implicated or of the particular procedure for implementing the service. In the system of the invention, however, a query signal 36 is originated from an SSP processor 26 and is sent from the SSP 12 to the address associated with the trigger, which can comprise a local server 70, which can comprise an SCP or computer terminal, for instance, via a link 30. As described above with reference to FIG. 1, the query signal 36 identifies the subscriber station 8 associated with the trigger and provides information about the trigger condition. In this case, however, the query signal 36 also indicates that the SSP 12 is capable of executing services that are described by portable, platform-independent code. As such, the query signal is used for obtaining actual code to be executed at the SSP 12, rather than to obtain basic instructions from the SCP 14. The local server 70 to which the query signal 36 is sent can constitute, for example, an SCP, in which case the link 30 is generally part of an SS7 network, or can constitute a computer processor and an associated memory, in which case the link 30 can consist of a TCP/IP connection. The local server might also constitute an HLR 60 (see FIG. 1) or a VLR (not shown). In accordance with one embodiment of the invention, a local processor 74 of the local server 70 responds to the query signal 36 by determining what services are implicated by the trigger condition based on information stored in a local memory 74.

The local server 70 can instead send a subscriber information request signal 56 to a remote server 80 associated with the subscriber station 8 via a link 50. The remote server 80 can be, for instance, an SCP, an HLR, a VLR, or a computer terminal, and the link 50 can comprise either some type of telecommunications connection, such as an SS7 link, or some type of data communications connection, such as a TCP/IP connection. The information request signal 56 can include an indication that a particular service or set of services are needed or can simply pass on the trigger condition information received from the SSP 12. In addition, the information request signal 56 can also include an indication that the local server 70 is capable of executing portable, platform-independent code.

In response to the request signal 56, certain subscriber information is retrieved and a subscriber information response signal 58 is sent from the remote server 80 to the local server 70. Following the receipt of the response signal 58, a set of instructions for executing each of the services that are both implicated by the particular trigger condition and subscribed to by the mobile user are retrieved from the local memory 72. Some of these instruction sets might be executed in the local server 70 by the local processor 74, with an instruction message 38 being sent to the SSP 12 directing the SSP 12 to process the call in accordance with the outcome of the executed services.

In one embodiment of the invention, however, one or more of the instruction sets comprise a JAVA code or some other type of portable, executable, platform-independent code. Each of these instruction sets is forwarded as a JAVA applet, for example, to the SSP 12 over an SS7 link 30. As an alternative, an applet, or some similar bundle of code, can be sent as a separate message over a TCP/IP link. The use of TCP/IP links reduces costs because the transport of data over TCP/IP connections is less expensive than the use of SS7 stacks. The received code is then executed in the SSP processor 26, which operates in conjunction with the received code as a virtual machine, and the SSP processor 26 directs further processing of the call. Such processing is generally performed in accordance with the results of the locally executed services (i.e., the outcome of the SSP's execution of the received code) and with the instructions received from the local server 70, if any. Finally, the call progresses to another PIC 22 as dictated by the executed services.

In an alternative embodiment, upon receiving the query signal 36 in the local server 70 from the SSP 12, the local server 70 requests subscriber information from the remote server 80 associated with the subscriber station 8, as in the previous embodiment. In this case, however, the subscriber data signal 58 itself includes one or more applets, or other similar bundle of code. These applets provide instructions for implementing a particular service. The applicable applets can then be executed by the local processor 74 in the local server 70, with corresponding instructions provided to the SSP 12, or preferably, can be forwarded to the SSP 12 for execution by the SSP processor 26. The retrieved applets can then be stored in the local memory 72 for use in responding to subsequent trigger conditions. As an alternative, the platform independent code can be sent directly to the SSP 12 from the remote server 80 over a TCP/IP link 90 (as indicated at 94). Similarly, instead of sending the initial query signal 36 to the local server 70, it is also possible to send a remote query signal 92 directly to the remote server 80, wherein the platform independent code is then sent in a response signal 94. Appropriate bundles of code could thereby be retrieved by the SSP 12 directly from the remote server 80. Alternatively, a response to the remote query signal 92 can be returned via the local server 70 (as generally indicated at 58 and 38).

By using any of the above-described embodiments of the invention, it is possible to implement subscriber-customized or proprietary services in visited networks and to introduce such services without having to develop industry standard protocols and without being limited to existing IN interfaces. As a result, new services can be introduced on a widespread basis more rapidly than is currently possible. Furthermore, the implementation of dynamic, subscriber-customized or proprietary services can be accomplished by sending a trigger condition query to a subscriber-specific or trigger-specific address that identifies a server associated with the subscriber or the trigger, as long as proper addressing is provided.

The particular server that is used can consist of virtually any server in the data communication or telecommunications network, and can range from a large, centralized computer database to a subscriber's home PC. Instead of having to upgrade each SSP 12 or SCP 14 in a telecommunications system 10 every time a new service is introduced, each SSP 12 or SCP 14 only needs to be upgraded once so that the SSP processor 26, or service manager 40 can handle the execution of platform independent code. For example, if the JAVA virtual machine and the JAVA instructions are supported at the switch or the SCP 14, then any service described in a JAVA applet can be executed at the switch or the SCP 14. Then, the service invocation query simply retrieves actual code from the specified server associated with the subscriber, and that code is executed at the switch.

In another aspect of the invention, the network includes a security mechanism to prevent unwanted or potentially harmful code (e.g., a virus) from being downloaded to the local server 70. Thus, the SSP processor 26 and/or the local server 70 can require a security code from the remote server 80, which must be accepted before the transferred code will be executed. As an alternative, the SSP 12 and/or SCP 14 can send an indication that they support platform-independent code, or accept platform-independent code, only if the remote server 80 is "trusted" (i.e., operated by a known entity).

In addition to using the transfer of platform independent code to respond to trigger conditions at detection points 24 of a call model 20, this aspect of the invention can also be used in wireless IN systems in connection with mobility management activities, such as registration and authentication. Accordingly, a detection of a trigger condition at a particular state in a mobility management model can lead to the same type of transfer and execution of platform independent code as is described above in connection with call models.

Generally, the hardware necessary for implementing the invention is present in existing systems, although there may be a need for additional processing resources in the switch and/or local server 70 (i.e., in the SSP processor 26) to support the added processing requirements of the virtual machine. In other respects, existing system software can generally be modified to handle the additional function of executing platform independent code. Subsequently, actual code, for a potentially unlimited number of different services, can be received and executed by the switch and/or the local server 70. Furthermore, as an additional benefit, the code can be transported over TCP/IP links instead of SS7 links to reduce the cost associated with transmitting data.

As an additional benefit, the invention can also be used to provide local services that only apply in a visited area. Thus, instead of downloading code from the remote home server, code describing the subscriber's specialized local services can be stored at the local server 70 and can be downloaded to the SSP 12 from the local server 70 when the subscriber station 8 registers in the visited area.

Figure 3:
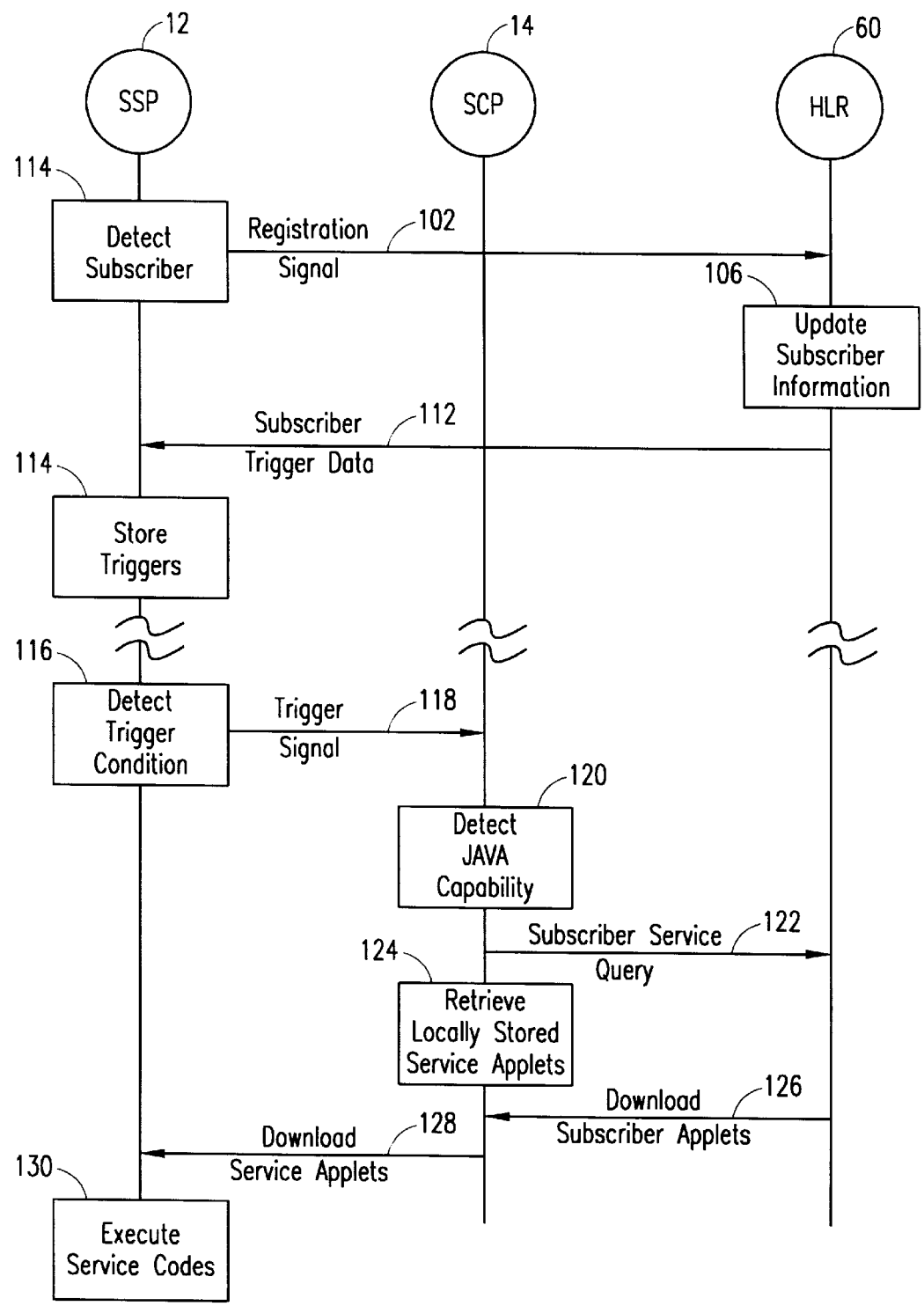
FIG. 3 is a message flow and network operation diagram illustrating an activation of specialized triggers and an execution of specialized services at a mobile telecommunications switch in accordance with the present invention.

Reference is now made to FIG. 3, which is a message flow and network operation diagram illustrating an activation of subscribed-to triggers and an execution of specialized services at a mobile telecommunications switch in accordance with the present invention. First, in a wireless network, the presence of a mobile subscriber station 8 within a particular cell served by the SSP 12 is detected at step 100 (i.e., through the receipt of a registration signal at the SSP 12). A registration signal 102 is forwarded to an HLR 60 associated with the mobile station 8. The registration signal 102 serves to inform the HLR 60 of the present location of the mobile station 8, so that incoming calls can be forwarded to the appropriate mobile switching center (i.e., SSP 12) for the served subscriber, for example. In addition, the HLR 60 might also receive instructions from the mobile station 8. The subscriber information is updated, in accordance with the location information and any received instructions, at step 106. Furthermore, the registration signal 102 generally serves as an implied request for information about the subscriber. Accordingly, data describing the subscriber's triggers is transmitted from the HLR 60 to the SSP 12 in a registration response signal 112 and is stored in the SSP 12 at step 114. The registration response signal 112 can include an address at which an appropriate service code for responding to the trigger condition is stored. As a result, the subscriber's triggers are incorporated into the call model for calls involving the particular subscriber. In a wireline system, on the other hand, the subscriber's triggers are permanently stored in the switch.

Subsequently, one of the stored trigger conditions is hit at step 116, when the subscriber makes a call attempt, for example, and a trigger signal 118 (corresponding to the signal 36 in FIG. 2) is sent to the SCP 14 or to another node as indicated by an address included in the registration response signal 112. The trigger signal 118 identifies the subscriber and the trigger condition and indicates that the SSP 12 is capable of supporting JAVA-implemented services. Upon receiving the trigger signal 118, the SCP 14 detects that the SSP 12 is capable of executing JAVA applets at step 120, and at step 124, the SCP 14 retrieves the applicable applets that are stored in the SCP 14. Then, instead of sending instructions to the SSP 12 as in the prior art, bundles of actual code representing each of the applicable services are downloaded (as indicated at 128) to the SSP 12. In addition or in the alternative, in response to the trigger signal 118, a subscriber service query 122 can be sent to the HLR 60 (or to another node) requesting information about the subscriber's customized services or invoking a particular service present at the HLR 60. In response, the HLR 60 sends a return signal 126 containing the applicable service applets, which can be downloaded to the SSP 12 (as indicated at 128) or executed at the SCP 14, with the resulting instructions being sent to the SSP 12. Finally, the SSP 12 executes the downloaded code at step 130, and processing of the call continues in accordance with the executed services.

Although a preferred embodiment of the method and apparatus of the present invention has been illustrated in the accompanying Drawings and described in the foregoing Detailed Description, it is understood that the invention is not limited to the embodiment disclosed, but is capable of numerous rearrangements, modifications, and substitutions without departing from the spirit of the invention as set forth and defined by the following claims.

What is claimed is:

1. A method for implementing services in an intelligent network of a telecommunications system, comprising the steps of:

detecting a telecommunications event in the telecommunications system;

downloading executable, platform independent code from a source node in the telecommunications system to a receiving node in the telecommunications system in response to said detection of the telecommunications event; and executing, at the receiving node, the platform independent code to implement the telecommunications service feature.

2. The method of claim 1 wherein the telecommunications event comprises a trigger condition.

3. The method of claim 2 wherein the step of downloading platform independent code to the receiving node further comprises the steps of:

transmitting a query signal to a server associated with subscriber associated with said telecommunications event; and receiving the platform independent code from the server.

4. The method of claim 3 wherein the query signal includes an indication that the receiving node is capable of executing platform independent code.

5. The method of claim 3 further comprising the step of transporting the platform independent code over a TCP/IP network.

6. The method of claim 5 wherein the platform independent code includes at least one JAVA applet.

7. The method of claim 1 wherein the telecommunications event occurs in connection with a call connection.

8. The method of claim 7 further comprising the step of processing the call connection in accordance with the implemented service feature.

9. The method of claim 1 further comprising the step of receiving a security code from said source node before executing the platform independent code.

10. The method of claim 1 wherein the telecommunications event occurs in connection with a registration access.

11. A system for implementing services in a telecommunications network, comprising:

a remote server storing a portable, platform-independent code describing at least one service;

a telecommunications switch for routing calls involving a subscriber station, the switch detecting a trigger condition and, in response to the detected trigger condition, issuing a request for instructions for responding to the trigger condition;

a processor associated with the switch;

a communications link between the processor and the remote server, said link transporting the portable, platform-independent code from the remote server to the processor in response to the request for instructions; and wherein the processor associated with the switch executes the portable, platform-independent code to provide a particular telecommunications service to the switch.

12. The system of claim 11 wherein the remote server comprises a service control point.

13. The system of claim 11 wherein the processor is located in a service control point in some way associated with the subscriber.

14. The system of claim 11 wherein the remote server comprises a home location register in a mobile telecommunications network.

15. The system of claim 11 wherein the remote server comprises a visitor location register in a mobile telecommunications network.

16. The system of claim 11 wherein the communications link comprises a TCP/IP link.

17. The system of claim 11 wherein the communications link comprises a link in a Signal Switching No. 7 network.

18. The system of claim 11 wherein the processor is located in the telecommunications switch.

19. The system of claim 11 further comprising a local server, the local server receiving said request for instructions from the switch and forwarding said request for instructions to the remote server.

20. The system of claim 19 wherein the processor is located in the local server.

21. The system of claim 19 wherein the local server comprises a service control point in some way associated with the subscriber.

22. The system of claim 11 wherein the switch stores customized trigger data associated with the network subscriber.

23. A method for implementing services in a telecommunications network, comprising the steps of:

retrieving trigger data associated with a selected subscriber station, the trigger data defining a specified trigger condition;

storing the trigger data in a telecommunications node of the network;

detecting the specified trigger condition at the telecommunications node;

retrieving platform independent code from a remote server in response to the detection of the specified trigger condition; and executing the platform independent code at the telecommunications node to implement a telecommunications service.

24. The method of claim 23 wherein the remote server stores subscriber data associated with the particular subscriber station, the stored subscriber data including the platform independent code.

25. The method of claim 23 wherein the trigger data is retrieved in response to a detection of the subscriber station in the telecommunications network.

26. The method of claim 25 wherein the detection of the subscriber station includes receiving a registration signal from the subscriber station.

27. The method of claim 25 wherein the detection of the subscriber station includes connecting a call involving the subscriber station.

28. The method of claim 23 further comprising the step of selecting a service for execution at the telecommunications node, the selected service corresponding to the specified trigger condition, and wherein the platform independent code comprises instructions for implementing the selected service.

29. The method of claim 28 wherein the step of retrieving the platform independent code further comprises the steps of:

transmitting a query signal to the remote server, the query signal identifying the trigger condition; and transferring the platform independent code from the remote server to the telecommunications node over a communications link.

30. The method of claim 29 wherein the query signal includes an indication that the telecommunications node supports an execution of platform independent code.

* * * * *

UNITED STATES PATENT AND TRADEMARK OFFICE
CERTIFICATE OF CORRECTION

PATENT NO.   : 6,327,355 B1                                              Page 1 of 1
DATED        : December 4, 2001
INVENTOR(S)  : Britt It is certified that error appears in the above-identified patent and that said Letters Patent is hereby corrected as shown below:

Column 8,
Line 37, replace "the" with -- a --
Line 45, insert -- a -- before "subscriber"
Line 45, insert -- station -- after "subscriber"

Column 9,
Line 43, insert -- station -- after "subscriber"
Line 45, delete "network"
Line 46, insert -- station -- after "subscriber"

Column 10,
Line 16, replace "particular" with -- selected --

Signed and Sealed this

Fourteenth Day of May, 2002

*Attest:*

*Attesting Officer*

JAMES E. ROGAN
*Director of the United States Patent and Trademark Office*